US012217631B2

(12) United States Patent
Wittmeyer, Jr. et al.

(10) Patent No.: US 12,217,631 B2
(45) Date of Patent: Feb. 4, 2025

(54) SCORED LABELS AND RECEIPTS

(71) Applicants: Larry E. Wittmeyer, Jr., Lake Lotawana, MO (US); Alexander Yambao, Las Vegas, NV (US)

(72) Inventors: Larry E. Wittmeyer, Jr., Lake Lotawana, MO (US); Alexander Yambao, Las Vegas, NV (US)

( * ) Notice: Subject to any disclaimer, the term of this patent is extended or adjusted under 35 U.S.C. 154(b) by 126 days.

(21) Appl. No.: 17/941,138

(22) Filed: Sep. 9, 2022

(65) Prior Publication Data

US 2024/0087478 A1   Mar. 14, 2024

(51) Int. Cl.
*G09F 3/02*  (2006.01)
*B26D 3/08*  (2006.01)
*C09J 7/21*  (2018.01)
*C09J 201/00*  (2006.01)

(52) U.S. Cl.
CPC .............. *G09F 3/02* (2013.01); *B26D 3/085* (2013.01); *C09J 7/21* (2018.01); *C09J 201/00* (2013.01); *C09J 2203/334* (2013.01); *C09J 2203/37* (2020.08); *C09J 2301/18* (2020.08); *C09J 2400/283* (2013.01); *G09F 2003/025* (2013.01); *G09F 2003/0258* (2013.01); *G09F 2003/0264* (2013.01)

(58) Field of Classification Search
CPC ................. G09F 3/02; G09F 2003/025; G09F 2003/0258; G09F 2003/0264; G09F 2003/0222; G09F 2003/0272; G09F 3/10; B26D 3/085; C09J 7/21; C09J 201/00; C09J 2203/334; C09J 2203/37; C09J 2301/18; C09J 2400/283
See application file for complete search history.

(56) References Cited

U.S. PATENT DOCUMENTS

| | | | | |
|---|---|---|---|---|
| 5,547,738 | A | * | 8/1996 | Mitchell .................. C09J 7/50 428/354 |
| 6,074,747 | A | * | 6/2000 | Scholz .................. B41M 5/529 428/452 |
| 2021/0375160 | A1 | * | 12/2021 | Vigunas .................. G09F 3/10 |

FOREIGN PATENT DOCUMENTS

WO   WO-9917906 A1 * 4/1999 ............. B42D 5/003

* cited by examiner

*Primary Examiner* — Patricia L. Nordmeyer

(57) ABSTRACT

A labeling system, comprising at least one label, wherein the at least one label is configured to receive printing thereon, and wherein the at least one label further comprises a release coating layer; a paper layer; a primer layer deposited on the paper layer; and an adhesive layer deposited over the primer layer, wherein a plurality of score lines have been cut into the at least one label at predetermined locations, to predetermined depths, and in predetermined patterns.

16 Claims, 5 Drawing Sheets

SCORED LABELS AND RECEIPTS

BACKGROUND

The disclosed inventive subject matter relates in general to printed receipts and labels for use with various types of packaging, and more specifically to systems and methods for manufacturing printable receipts and labels that do not include a liner, are dry until moistened, and that cannot be removed from a bag or box to which they are attached without damaging or destroying the printed receipt or label.

Receipts and labels used for commercial purposes are typically constructed as multilayered materials that often include a face stock component; an adhesive component; a release coating component; and a release liner component. The face stock is the surface material of the receipt or label and may be paper, foil, film or cloth-material that is designed to be printed upon and converted into pressure sensitive stock. The adhesive is designed as a coating layer to adhere to a wide variety of surfaces and may be either permanent or removable for long or short-term use. The release coating is a unique coating applied to a liner that regulates a correct adhesion release. The release level is a measure of the peel strength from a release liner. The release liner protects the adhesive from contamination and is removed for application of the label.

Commercial labels that are intended to be permanent often use a pressure-sensitive adhesive and include a liner component, which makes the label expensive to manufacture and non-recyclable due to the non-recyclable material used in the liner. Repositionable labels that do not include a liner do not adhere well to recyclable containers and untreated plastic. Furthermore, the adhesives used with such labels are not considered safe for human consumption if the adhesives come into contact with food or other consumables stored in the containers on which such labels have been placed. Accordingly, there is an ongoing need for a low-cost, linerless, permanent label or receipt that can be used on various boxes, bags, and other containers that includes a food grade adhesive that accepted by regulatory authorities such as the U.S. Food and Drug Administration (FDA).

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a labeling system, comprising at least one label, wherein the at least one label is configured to receive printing on one side thereof, and wherein the at least one label further comprises a release coating layer; a paper layer; a primer layer deposited on the paper layer; and an adhesive layer deposited over the primer layer, wherein a plurality of score lines have been cut into the at least one label at predetermined locations, to predetermined depths, and in predetermined patterns. The label is typically linerless and is provided in a rolled configuration. Additionally, the side of the label that receives the printing is typically opposite the side of the label upon which the adhesive is deposited.

The at least one label may further comprise either a thermal coating layer or an inkjet receptive layer deposited between the release coating and the paper layer. The plurality of score lines may be cut into the at least one label either prior to deposition of the primer and adhesive or after deposition of the primer and adhesive. The plurality of score lines may be cut into the at least one label to a depth in the range of 10% to 100%. The depth of the score lines may be variable along the length of the at least one label. The plurality of score lines may be cut into either the front side of the label, which is the side of the label that receives printing, or the back side of the label, which is the side of the label that bears the adhesive, in an orientation that is either parallel to the length of the at least one label or perpendicular to the length of the at least one label. The primer layer may be deposited in a series of strips on the at least one label, wherein the orientation of the strips of primer is either parallel to the length of the at least one label or perpendicular to the length of the at least one label, and wherein the score lines are cut into the at least one label between the strips of primer. The adhesive layer may include at least two materials, wherein the first material is deposited in a layer having a predetermined thickness, wherein the second material is deposited in a layer having a predetermined thickness, and wherein the predetermined thickness of the layer of the first material is either less than the predetermined thickness of the layer of the second material or greater than the predetermined thickness of the layer of the second material. The first material may be either a repositionable adhesive, a remoistenable adhesive, or a non-adhesive material; and the second material may be either a remoistenable adhesive, a repositionable adhesive, or a pressure sensitive adhesive. The at least one label may be configured for use as a receipt, wherein the receipt is configured to seal a package to which it is attached in a tamper-proof manner by creating a closure that can only be removed by damaging or destroying the package, the receipt, or both the package and the receipt.

Another implementation of the disclosed technology provides a labeling system, comprising at least one label, wherein the at least one label is configured to receive printing on one side thereof, and wherein the at least one label further comprises a release coating layer; a paper layer; a primer layer deposited on the paper layer; and an adhesive deposited over the primer layer, wherein a plurality of score lines have been cut into the at least one label at predetermined locations, to predetermined depths, and in predetermined patterns; wherein the plurality of score lines are cut into the at least one label to a depth in the range of 10% to 100%; and wherein the plurality of score lines are cut into either the front side of the label, which is the side of the label that receives printing, or the back side of the label, which is the side of the label that bears the adhesive, in an orientation that is either parallel to the length of the at least one label or perpendicular to the length of the at least one label. The label is typically linerless and is provided in a rolled configuration. Additionally, the side of the label that receives the printing is typically opposite the side of the label upon which the adhesive is deposited.

The at least one label may further comprise either a thermal coating layer or an inkjet receptive layer deposited between the release coating and the paper layer. The plurality of score lines may be cut into the at least one label either prior to deposition of the primer and adhesive or after deposition of the primer and adhesive. The depth of the score lines may be variable along the length of the at least one label. The primer layer may be deposited in a series of strips on the at least one label, wherein the orientation of the strips of primer is either parallel to the length of the at least one label or perpendicular to the length of the at least one label, and wherein the score lines are cut into the at least one label between the strips of primer. The adhesive layer may include at least two materials, wherein the first material is deposited in a layer having a predetermined thickness, wherein the second material is deposited in a layer having a predetermined thickness, and wherein the predetermined thickness of the layer of the first material is either less than the predetermined thickness of the layer of the second material or greater than the predetermined thickness of the layer of the second material. The first material may be either a repositionable adhesive, a remoistenable adhesive, or a non-adhesive material; and the second material may be either a remoistenable adhesive, a repositionable adhesive, or a pressure sensitive adhesive. The at least one label may be configured for use as a receipt, wherein the receipt is configured to seal a package to which it is attached in a tamper-proof manner by creating a closure that can only be removed by damaging or destroying the package, the receipt, or both the package and the receipt.

Still another implementation of the disclosed technology provides a method for making a label, comprising providing a label, wherein the label is configured to receive printing thereon, and wherein the label further comprises a release coating layer, a paper layer, a primer layer, and an adhesive layer; and cutting a plurality of score lines into the label at predetermined locations, to predetermined depths, and in predetermined patterns, wherein the plurality of score lines are cut into the at least one label to a depth in the range of 10% to 100%; and the plurality of score lines are cut into the at least one label in an orientation that is either parallel to the length of the at least one label or perpendicular to the length of the at least one label. The label is typically linerless and is provided in a rolled configuration.

The method may further comprise using a die to cut the plurality of score lines into the label at predetermined locations, to predetermined depths, and in predetermined patterns, wherein the plurality of score lines is cut into either the front side of the label, which is the side of the label that receives printing, or the back side of the label, which is the surface of the label that bears the adhesive. The plurality of score lines may be cut into the at least one label either prior to deposition of the primer and adhesive or after deposition of the primer and adhesive. The depth of the score lines may be variable along the length of the at least one label. The primer layer may be deposited in a series of strips on the at least one label, wherein the orientation of the strips of primer is either parallel to the length of the at least one label or perpendicular to the length of the at least one label, and wherein the score lines are cut into the at least one label between the strips of primer.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
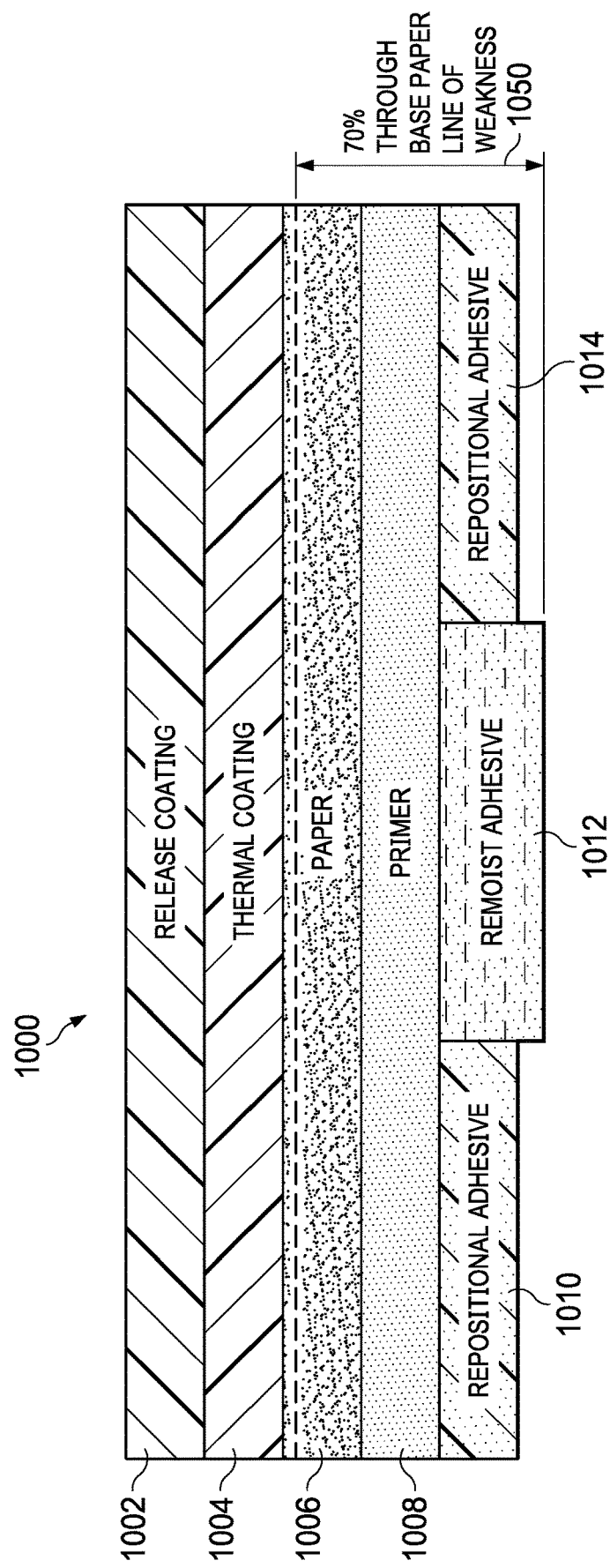
FIG. 1 is a cross-sectional depiction of an example implementation of a label having a construction that includes a release coating layer; a thermal coating layer; a paper layer; a primer layer; and an adhesive layer, wherein the adhesive layer includes a remoistenable adhesive strip having a predetermined thickness deposited between first and second repositionable adhesive strips, each having a predetermined thickness, wherein the thickness of the remoistenable adhesive strip is greater than the thickness of the first and second repositionable adhesive strips, and wherein score lines or lines of weakness have been cut into the label to a depth of 70% of the paper layer.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Disclosed are systems, devices, and methods for making printed labels or printed receipts on paper that includes score lines or "lines of weakness" that are die cut into the paper at predetermined locations, to predetermined depths, and in predetermined patterns. In some implementations, the labels are rolled linerless labels. The lines of weakness serve several purposes, including facilitating straight folding of the label or receipt for application to a bag or sack; and facilitating straight folding of the label or receipt when it is folded in half and applied to itself. When the score lines are cut into the paper prior to the application of primer and adhesive, the score lines permit the primer and adhesive to enter the body of the paper, thereby enhancing adhesion of the adhesive to fibers of the paper. As a result, after the label or receipt has been applied to a package or has been adhered to itself, any attempt to remove the label or separate it from itself will result in destruction of the label. Destruction of the label in this manner provides clear visual evidence of tampering with the label and/or the package to which it has been attached or has been used to seal. Using adhesive labels to seal sacks or bags by running (i.e., looping) the label through handles formed on or in such sacks or bags is disclosed in U.S. patent application Ser. No. 17/495,918, which is incorporated herein by reference in its entirety for all purposes. Enhanced adhesion also prevents the adhesive from transferring during process of printing on the label.

The score lines or lines of weakness may be cut into a roll of paper using processes such as, for example, perforation, die cutting, and laser cutting. The score lines may be cut into the base paper of the label to a depth in the range of 10% to 100%, with depths of 50% to 70% being preferred for most applications. In some implementations, the depth of the score lines varies on the same form, e.g., 20% in some areas and 70% in other areas. This type of configuration can be used to control the peel rate of a wound roll of paper. The score lines may be cut into the side of the paper that receives printing or may be cut into the side of the paper that includes the adhesive rather than the side of the paper that receives printing. The score lines may be created in single or multiple straight lines running with the direction of the paper web (lengthwise) or across the paper web (widthwise). Cutting two parallel rows of patterned lines running lengthwise along the ribbon of paper prevents a printer from jamming as it leaves the outside and middle of the paper web at 100% strength. Acceptable patterns permit the paper to tear at any angle, for example, peeling straight or from the edges of the paper. The score lines may be formed prior to printing on the label or after printing on the label. The score lines may also be formed in the label in the rerolling process using custom machinery as existing rewinders do not include die stations.

With regard to label construction, it is a common industrial practice to deposit a release coating on an upper surface to which a thermal coating, inkjet receptive coating, or other coating receptive to printing, has already been applied. The release coating facilitates unwinding of a label roll within a printer because a repositionable adhesive deposited on the lower surface of the label encounters the release coating on the upper surface of the label such the roll does not bind together (e.g., stick to itself). The release coating also stops the repositionable adhesive from removing the thermal coating or inkjet receptive coating. If the thermal coating or inkjet receptive coating is inadvertently removed, the label will not print properly.

FIG. 1 depicts an example implementation of a receipt or label 1000 having a construction that includes release coating layer 1002, which may be solvent, water or ultraviolet (UV) based; thermal coating layer 1004; paper layer 1006; primer layer 1008 (e.g., HB Fuller part number 3991 PMR with 10% water based flexo ink added for color); and an adhesive layer, wherein the adhesive layer includes remoistenable adhesive strip 1012 having a predetermined thickness deposited between first and second repositionable adhesive strips (1010 and 1014, respectively), each having a predetermined thickness, wherein the thickness of remoistenable adhesive strip 1012 is greater than the thickness of first and second repositionable adhesive strips 1010 and 1014. Score lines or lines of weakness have been cut into receipt or label 1000 to a depth of 70% of the paper layer 1006 at 1050. Other types of adhesives compatible with the disclosed labels include cohesive, acrylic, hot melt, and ultraviolet (UV) type adhesives.

Repositionable strips 1010 and 1014 hold the receipt 1000 in place while the remoistenable adhesive 1012 dries and creates a permanent bond with the substrate. As will be appreciated by one of ordinary skill in the art, a repositionable adhesive allows a label to be repositioned without damage to either the label or the substrate. Many applications require that the adhesive hold the label firmly in place while not leaving residue behind when the label is removed. Repositionable adhesives are available from many commercial sources and may include a wide variety of ingredients. Repositionable adhesives used on labels are usually made with microsphere adhesives (particularly acrylic-based microsphere adhesives) that have relatively low initial tack and low ultimate adhesion meaning that a label can be removed without damaging the label or the substrate and has enough tack to be reapplied successfully. An example repositionable adhesive is 3991B1 (H.B. Fuller; Simpsonville, SC), which includes acrylic microspheres. An example remoistenable adhesive is A1 BOND 15-755 (A1 Chemical; Claymont, DE), which includes polyvinyl acetate (PVAc) with polyvinyl alcohol (PVOH).

Figure 2:
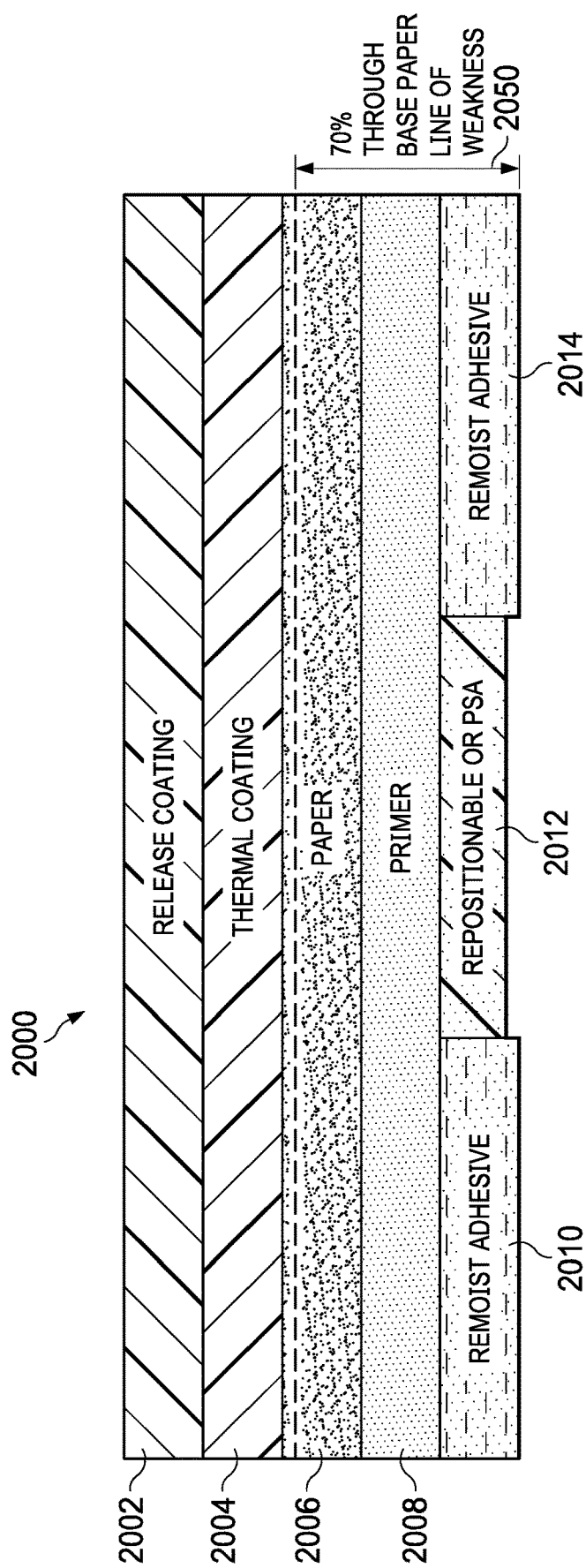
FIG. 2 is a cross-sectional depiction of an example implementation of a label having a construction that includes a release coating layer; a thermal coating layer; a paper layer; a primer layer; and an adhesive layer, wherein the adhesive layer includes a strip of repositionable adhesive or pressure sensitive adhesive having a predetermined thickness deposited between first and second strips of remoistenable adhesive, each having a predetermined thickness, wherein the thicknesses of the first and second strips of remoistenable adhesive are greater than the thickness of the strip of repositionable adhesive or pressure sensitive adhesive, and wherein score lines or lines of weakness have been cut into the label to a depth of 70% of the paper layer.

FIG. 2 provides a cross-sectional depiction of another example implementation of a label 2000 having a construction that includes release coating layer 2002, which may be solvent, water or ultraviolet (UV) based; thermal coating layer 2004; paper layer 2006; primer layer 2008 (e.g., HB Fuller part number 3991 PMR with 10% water based flexo ink added for color); and an adhesive layer, wherein the adhesive layer includes a strip of repositionable adhesive or pressure sensitive adhesive 2012 having a predetermined thickness deposited between first and second strips of remoistenable adhesive (2010 and 2014, respectively), each having a predetermined thickness, wherein the thicknesses of the first and second strips of remoistenable adhesive (2010, 2014) are greater than the thickness of the strip of repositionable adhesive or pressure sensitive adhesive 2012. Score lines or lines of weakness have been cut into receipt or label 2000, to a depth of 70% of the paper layer 2006 at 2050. Other types of adhesives compatible with the disclosed labels include cohesive, acrylic, hot melt, and ultraviolet (UV) type adhesives.

Figure 3A:
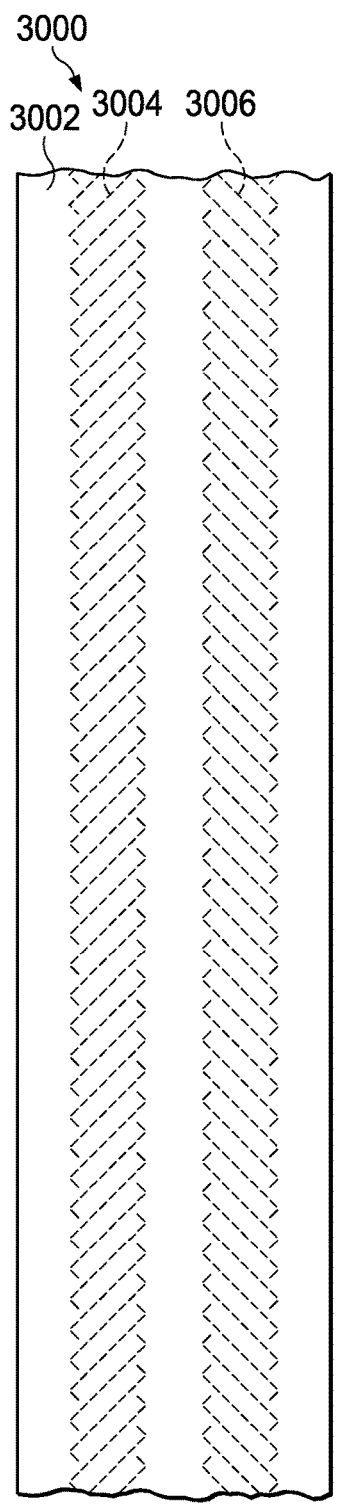
FIG. 3A depicts a first example pattern of multiple score lines or multiple lines of weakness cut lengthwise into a roll of paper, wherein the paper is shown in an unwound configuration.
Figure 3B:
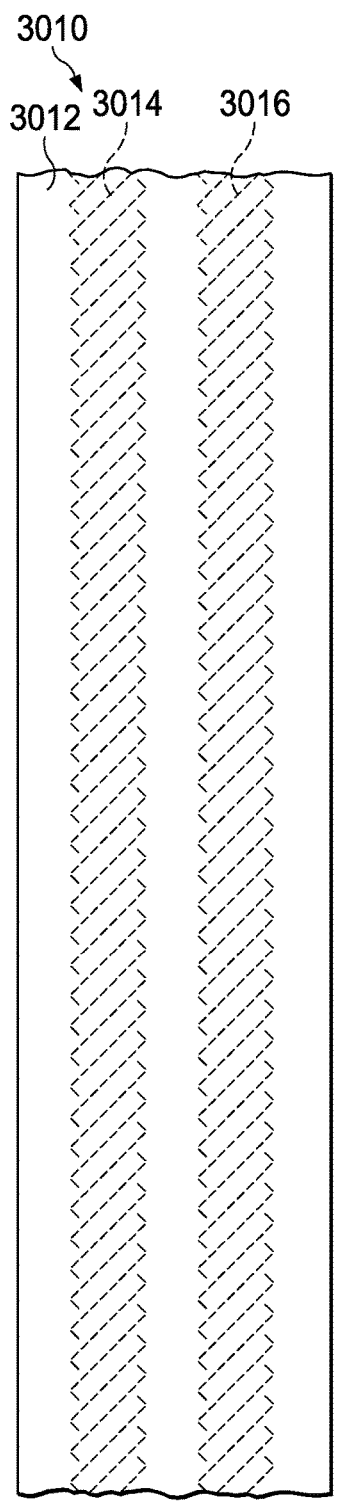
FIG. 3B depicts a second example pattern of multiple score lines or multiple lines of weakness cut lengthwise into a roll of paper, wherein the paper is shown in an unwound configuration.
Figure 3C:
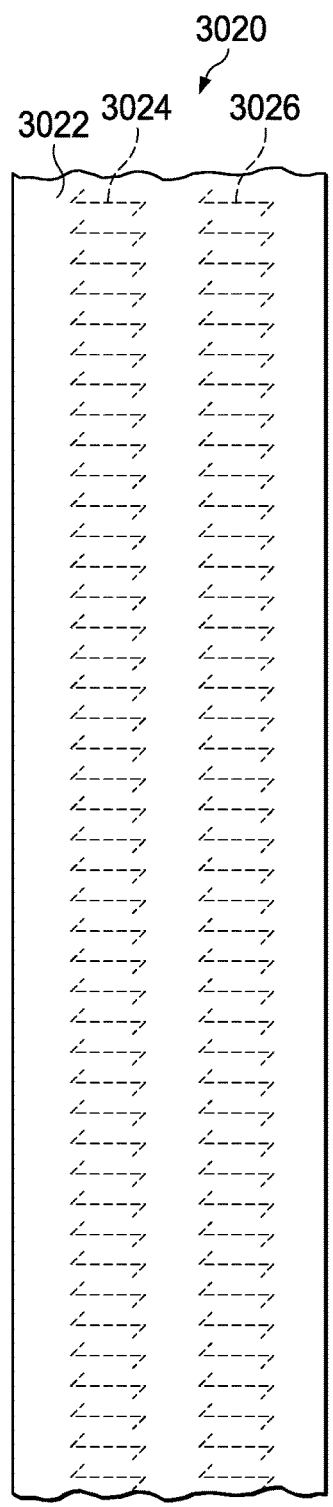
FIG. 3C depicts a third example pattern of multiple score lines or multiple lines of weakness cut lengthwise into a roll of paper, wherein the paper is shown in an unwound configuration.

FIG. 3A depicts a first example pattern of multiple score lines or multiple lines of weakness cut lengthwise into a roll of paper, wherein the paper is shown in an unwound configuration. In FIG. 3A, paper ribbon 3000 includes substrate 3002 into which score lines 3004 and 3006 have been die cut lengthwise in a predetermined pattern. FIG. 3B depicts a second example pattern of multiple score lines or multiple lines of weakness cut lengthwise into a roll of paper, wherein the paper is shown in an unwound configuration. In FIG. 3B, paper ribbon 3010 includes substrate 3012 into which score lines 3014 and 3016 have been die cut lengthwise in a predetermined pattern. FIG. 3C depicts a third example pattern of multiple score lines or multiple lines of weakness cut lengthwise into a roll of paper, wherein the paper is shown in an unwound configuration. In FIG. 3C, paper ribbon 3020 includes substrate 3022 into which score lines 3024 and 3026 have been die cut lengthwise in a predetermined pattern. Numerous other patterns are possible with regard to the die cut score lines, and the score lines may be cut into the paper at any point in the manufacturing process. As previously stated, for some applications is it advantageous to cut or otherwise form the score lines in the paper on the side of the label or receipt that receives printing. For other applications, it is advantageous to cut or otherwise form the score lines in the paper on the side of the paper that bears the adhesive to avoid interfering with printing on the other side of the paper.

Figure 4:
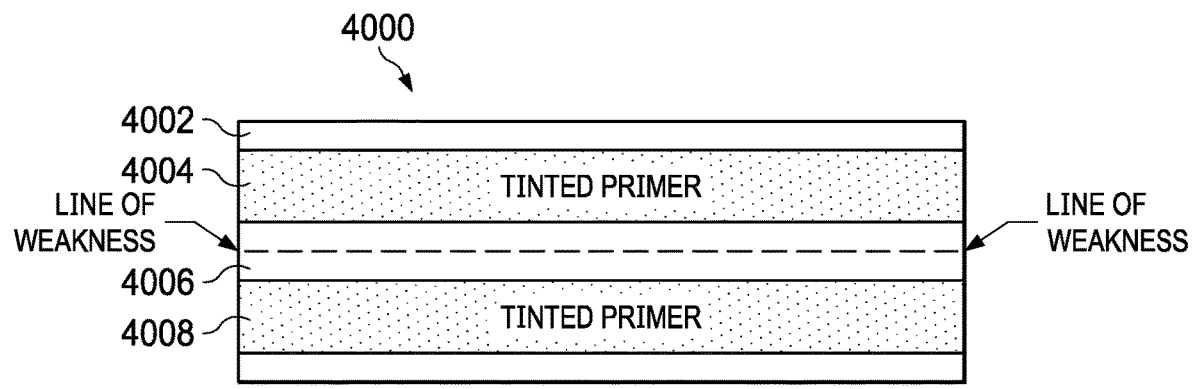
FIG. 4 depicts unwound paper, wherein strips of tinted primer have been deposited lengthwise on one side of the paper and a score line or line of weakness has been cut into the paper between the strips of tinted primer.
Figure 5:
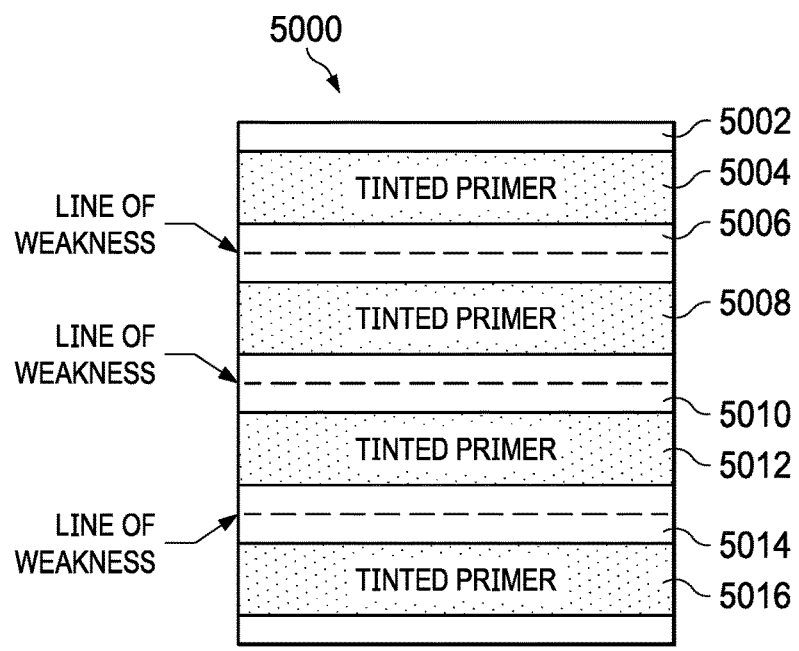
FIG. 5 depicts unwound paper, wherein strips of tinted primer have been deposited widthwise on one side of the paper and score lines or lines of weakness have been cut into the paper between the strips of tinted primer.

FIG. 4 depicts unwound paper 4000, wherein strips of tinted primer 4004 and 4008 have been deposited lengthwise on one side (4002) of the paper 4000 and score line or line of weakness 4006 has been cut into the paper 4000 between the strips of tinted primer 4004 and 4008. FIG. 5 depicts unwound paper 5000, wherein strips of tinted primer 5004, 5008, 5012, and 5016 have been deposited widthwise on one side of the paper (5002) and score lines or lines of weakness 5006, 5010, and 5014, have been cut into the paper 5000 between the strips of tinted primer 5004, 5008, 5012, and 5016. The strips of primer 5004, 5008, 5012, and 5016 may serve as guides for proper placement of the adhesive or adhesives on the label.

Figure 6:
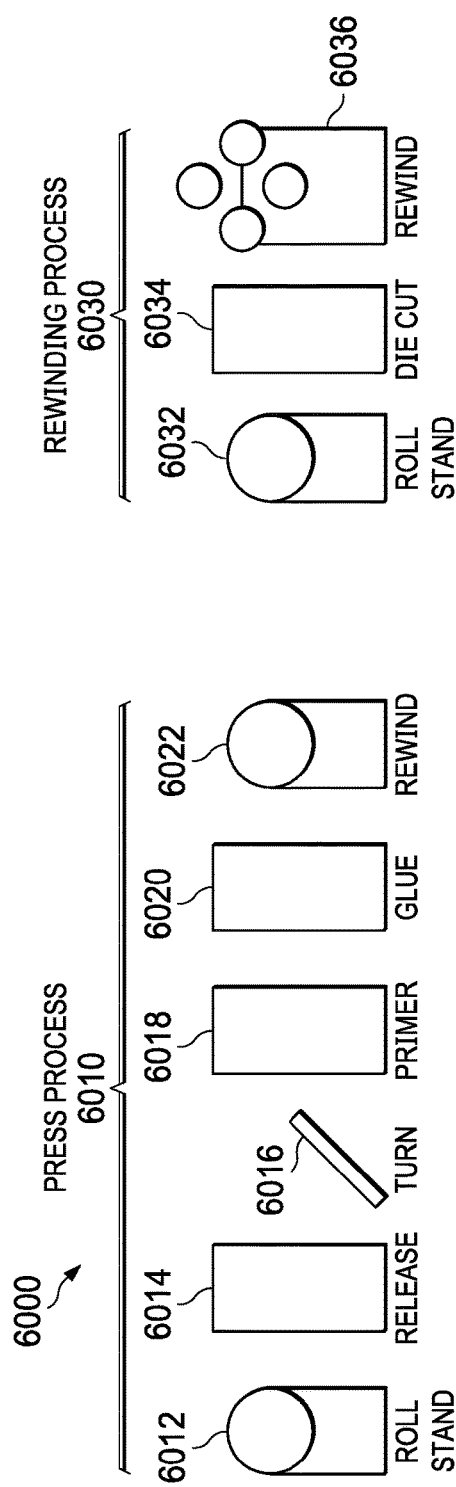
FIG. 6 depicts a first example system for creating the disclosed scored labels, wherein the system includes a specific press process and a specific rewinding process.

FIG. 6 depicts a first example system 6000 for creating the disclosed scored labels, wherein system 6000 includes a specific press process and a specific rewinding process. Press process 6010 includes placing a roll of linerless paper on a roll stand at 6012; depositing a release layer at 6014; turning the paper over at 6016; depositing a primer layer at 6018; depositing an adhesive layer at 6020; and rewinding the paper at 6022. Rewinding process 6030 includes placing the roll of paper on a roll stand at 6032; die cutting the paper as described above at 6034; and rewinding the paper at 6036.

Figure 7:
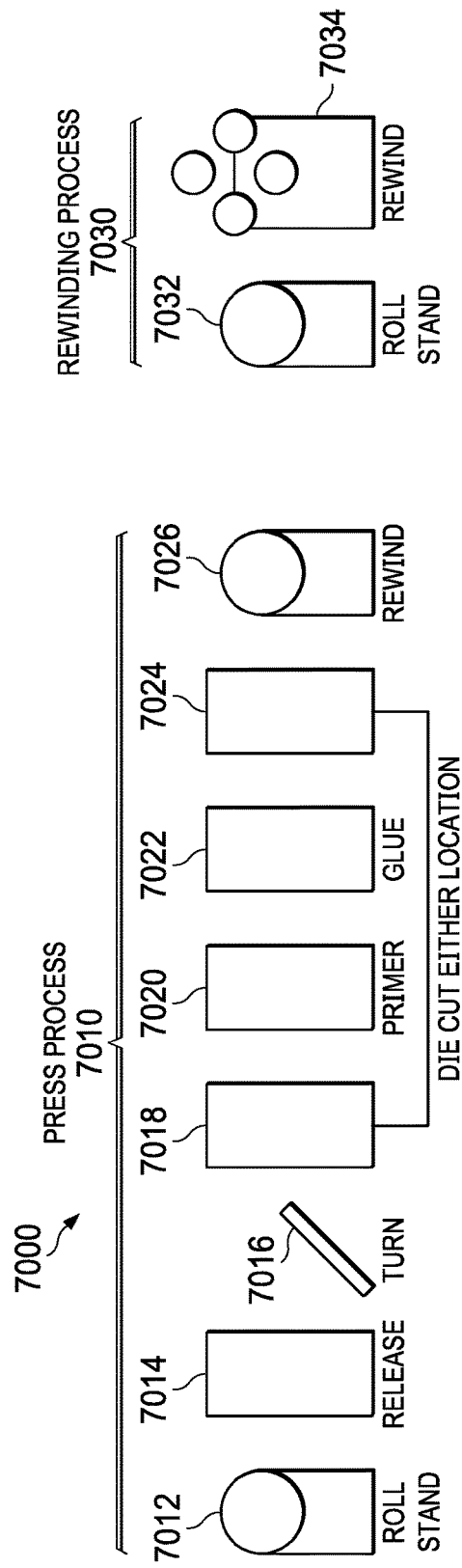
FIG. 7 depicts a second example system for creating the disclosed scored labels, wherein the system includes a specific press process and a specific rewinding process.

FIG. 7 depicts a second example system 7000 for creating the disclosed scored labels, wherein system 7000 includes a specific press process and a specific rewinding process. Press process 7010 includes placing a roll of linerless paper on a roll stand at 7012; depositing a release layer at 7014; turning the paper over at 7016; die cutting the paper as described above at a first location at 7018; depositing a primer layer at 7020; depositing an adhesive layer at 7022; die cutting the paper as described above at a second location at 7024; and rewinding the paper at 7026. Rewinding process 7030 includes placing the roll of paper on a roll stand at 7032; and rewinding the paper at 7034.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A labeling system, comprising:
   (a) at least one label having a length, wherein the at least one label is configured to receive printing on one side thereof, and wherein the at least one label further comprises:
      (i) a release coating layer;
      (ii) a paper layer;
      (iii) a primer layer deposited on the paper layer; and
      (iv) an adhesive layer deposited over the primer layer,
   (b) wherein a plurality of score lines have been cut into the at least one label at predetermined locations, to predetermined depths, and in predetermined patterns, and wherein the plurality of score lines is cut into the least one label prior to deposition of the primer and adhesive.

2. The labeling system of claim 1, further comprising either a thermal coating layer or an inkjet receptive layer deposited between the release coating and the paper layer.

3. The labeling system of claim 1, wherein the plurality of score lines is cut into the at least one label to a depth in the range of 10% to 100%.

4. The labeling system of claim 1, wherein the depth of the plurality of score lines is variable along the length of the at least one label.

5. The labeling system of claim 1, wherein the plurality of score lines is cut into either the side of the at least one label that receives printing or the side of the at least one label that bears the adhesive in an orientation that is either parallel to the length of the at least one label or perpendicular to the length of the at least one label.

6. The labeling system of claim 1, wherein the primer layer is deposited in a series of strips on the at least one label, wherein the orientation of the strips of primer is either parallel to the length of the at least one label or perpendicular to the length of the at least one label, and wherein the plurality of score lines is cut into the at least one label between the strips of primer.

7. The labeling system of claim 1, wherein the adhesive layer includes at least two materials,
   (a) wherein the first material is deposited over the primer layer in a layer having a predetermined thickness,
   (b) wherein the second material is deposited over the primer layer in a layer having a predetermined thickness, and
   (c) wherein the predetermined thickness of the layer of the first material is either less than the predetermined thickness of the layer of the second material or greater than the predetermined thickness of the layer of the second material.

8. The labeling system of claim 7, wherein the first material is either a repositionable adhesive, a remoistenable adhesive, or a non-adhesive material; and wherein the second material is either a remoistenable adhesive, a repositionable adhesive, or a pressure sensitive adhesive.

9. The labeling system of claim of claim 1, wherein the at least one label is configured for use as a receipt, and wherein the receipt is configured to seal a package to which it is attached in a tamper-proof manner by creating a closure that can only be removed by damaging or destroying the package, the receipt, or both the package and the receipt.

10. The labeling system of claim 1, wherein the at least one label is a linerless label that is configured as a roll.

11. A labeling system, comprising:
    (a) at least one label having a length, wherein the at least one label is configured to receive printing on one side thereof, and wherein the at least one label further comprises:
       (i) a release coating layer;
       (ii) a paper layer;
       (iii) a primer layer deposited on the paper layer; and
       (iv) an adhesive deposited over the primer layer,
    (b) wherein a plurality of score lines have been cut into the at least one label at predetermined locations, to predetermined depths, and in predetermined patterns;
    (c) wherein the plurality of score lines is cut into the at least one label to a depth in the range of 10% to 100%;
    (d) wherein the plurality of score lines is cut into the side of the at least one label that bears the adhesive in an orientation that is either parallel to the length of the at least one label or perpendicular to the length of the at least one label; and
    (e) wherein the plurality of score lines is cut into the at least one label either prior to deposition of the primer and adhesive or after deposition of the primer and adhesive, and wherein the depth of the plurality of score lines is variable along the length of the at least one label.

12. The labeling system of claim 11, further comprising either a thermal coating layer or an inkjet receptive layer deposited between the release coating and the paper layer.

13. The labeling system of claim 11, wherein the primer layer is deposited in a series of strips on the at least one label, wherein the orientation of the strips of primer is either parallel to the length of the at least one label or perpendicular to the length of the at least one label, and wherein the plurality of score lines is cut into the at least one label between the strips of primer.

14. The labeling system of claim 11, wherein the adhesive layer includes at least two materials,
   (a) wherein the first material is deposited over the primer layer in a layer having a predetermined thickness,
   (b) wherein the second material is deposited over the primer layer in a layer having a predetermined thickness,
   (c) wherein the predetermined thickness of the layer of the first material is either less than the predetermined thickness of the layer of the second material or greater than the predetermined thickness of the layer of the second material;
   (d) wherein the first material is either a repositionable adhesive, a remoistenable adhesive, or a non-adhesive material; and
   (e) wherein the second material is either a remoistenable adhesive, a repositionable adhesive, or a pressure sensitive adhesive.

15. The labeling system of claim 11, wherein the at least one label is configured for use as a receipt, and wherein the receipt is configured to seal a package to which it is attached in a tamper-proof manner by creating a closure that can only be removed by damaging or destroying the package, the receipt, or both the package and the receipt.

16. The labeling system of claim 11, wherein the at least one label is a linerless label that is configured as a roll.

* * * * *